(12) United States Patent
Rogin et al.

(10) Patent No.: US 9,040,154 B2
(45) Date of Patent: May 26, 2015

(54) MAGNETIC COMPOSITE PARTICLES

(75) Inventors: Peter Rogin, Saarbrücken (DE); Peter William de Oliveira, Saarbrücken (DE); Christian Wühr, Quierschied (DE); Michael Veith, St.-Ingbert (DE); Douglas Espin, Saarbrücken (DE)

(73) Assignee: Neotechnology LLC, Las Vegas, NV (US)

( * ) Notice: Subject to any disclaimer, the term of this patent is extended or adjusted under 35 U.S.C. 154(b) by 397 days.

(21) Appl. No.: 13/515,513

(22) PCT Filed: Dec. 14, 2010

(86) PCT No.: PCT/EP2010/007611
§ 371 (c)(1),
(2), (4) Date: Jul. 26, 2012

(87) PCT Pub. No.: WO2011/072838
PCT Pub. Date: Jun. 23, 2011

(65) Prior Publication Data
US 2012/0279712 A1 Nov. 8, 2012

(30) Foreign Application Priority Data

Dec. 16, 2009 (DE) .......................... 10 2009 058 650

(51) Int. Cl.
| | | |
|---|---|---|
| *G11B 5/708* | (2006.01) | |
| *B82Y 25/00* | (2011.01) | |
| *B03C 1/01* | (2006.01) | |
| *B03C 1/28* | (2006.01) | |
| *C01G 49/00* | (2006.01) | |
| *C09C 1/22* | (2006.01) | |
| *C09K 8/80* | (2006.01) | |
| *H01F 1/24* | (2006.01) | |

(52) U.S. Cl.
CPC ................. *B82Y 25/00* (2013.01); *G11B 5/708* (2013.01); *Y10T 428/2982* (2015.01); *B03C 1/01* (2013.01); *B03C 1/28* (2013.01); *B03C 2201/18* (2013.01); *C01G 49/0018* (2013.01); *C01G 49/0036* (2013.01); *C01P 2006/42* (2013.01); *C09C 1/22* (2013.01); *C09K 8/805* (2013.01); *H01F 1/24* (2013.01)

(58) Field of Classification Search
CPC .................................. G11B 5/708; C09K 8/80

USPC ............. 166/280.1, 280.2, 302, 57, 58, 66.5; 264/429; 428/842.3, 842.4, 842.5, 428/842.6, 323, 402, 692.1; 427/216; 507/270, 271, 272
See application file for complete search history.

(56) References Cited

U.S. PATENT DOCUMENTS

| | | | |
|---|---|---|---|
| 3,759,683 A | 9/1973 | Dislich et al. | |
| 5,716,424 A | 2/1998 | Mennig et al. | |
| 6,136,083 A | 10/2000 | Schmidt et al. | |
| 6,183,658 B1 | 2/2001 | Lesniak et al. | |
| 6,669,623 B1 | 12/2003 | Jordan | |
| 6,720,074 B2 * | 4/2004 | Zhang et al. | 428/842.4 |
| 2006/0037755 A1 | 2/2006 | Knobloch | |
| 2008/0073083 A1 * | 3/2008 | Shmotev et al. | 166/280.2 |
| 2009/0038797 A1 * | 2/2009 | Skala et al. | 166/280.1 |
| 2009/0288820 A1 | 11/2009 | Barron et al. | |

FOREIGN PATENT DOCUMENTS

| | | |
|---|---|---|
| DE | 1941191 A1 | 1/1971 |
| DE | 3719339 A1 | 12/1988 |
| DE | 4117041 A1 | 11/1992 |
| DE | 4217432 A1 | 12/1993 |
| DE | 19520964 A1 | 12/1996 |
| DE | 19614136 A1 | 10/1997 |
| DE | 19940220 A1 | 2/2001 |
| EP | 1232502 B1 | 8/2002 |

OTHER PUBLICATIONS

Shebanova, et al., "Raman spectroscopic study of magnetite (FeFe2O4): a new asignment for the vibrational specturm" May 2003, Journal of Solid State Chemistry, vol. 173, pp. 424-430.*
Notification of Transmittal of Translation of the International Preliminary Report on Patentability, International Application No. PCT/EP2010/007611, dated Jul. 2012.
English abstract of DE19520964 (A1), Dec. 12, 1996.
English abstract of DE19614136 (A1), Oct. 16, 1997.
English abstract of DE19940220 (A1), Feb. 22, 2001.
English abstract of DE4217432 (A1), Nov. 26, 1992.
English abstract of DE3719339 (A1), Dec. 22, 1988.
English abstract of DE4117041 (A1), Nov. 26, 1992.

* cited by examiner

*Primary Examiner* — Cathleen Hutchins
(74) *Attorney, Agent, or Firm* — Cahn & Samuels, LLP

(57) ABSTRACT

Magnetic composite particles can be used as proppants and allow for deliberate heating by applying an alternating magnetic field.

17 Claims, No Drawings

MAGNETIC COMPOSITE PARTICLES

This patent application is a U.S. national stage application of PCT international application PCT/EP2010/007611 filed on 14 Dec. 2010 and claims priority of German patent document 10 2009 058 650.4 filed on 16 Dec. 2009, the entirety of which is incorporated herein by reference.

FIELD OF THE INVENTION

The invention relates to magnetic composite particles and to processes for production thereof and use thereof.

BACKGROUND OF THE INVENTION

In the prior art, there are many known magnetic particles which are used, for example, for removal of biological substances by absorption (e.g. EP 1 232 502 B1). In particular, particles in the nanometer range or micrometer range are used (DE 196 14 136 A1). Such particles are also used in DE 199 40 220 A1 in cancer treatment for selective magnetic heating.

In addition, the coating of pigments in a sol-gel process is known from DE 195 20 964 A1.

A further important use of composite materials is use as proppants. These are filler materials for hydraulically generated fissures in underground formations, the filling of which with hard spherical granules generates a stable region with high permeability for liquids, for example mineral oil.

The problem addressed by the invention is that of providing magnetic composite particles which enable achievement of controlled heating by application of an alternating field.

SUMMARY OF INVENTION

This problem is solved by the inventions with the features of the independent claims. Advantageous developments of the inventions are characterized in the dependent claims. The wording of all claims is hereby incorporated into this description by reference. The invention also encompasses all viable and especially all mentioned combinations of independent and/or dependent claims.

The invention relates to magnetic composite particles which comprise at least one magnetic object and a vitreous binder phase.

The composite particles have a diameter between 0.1 and 50 mm, preferably between 0.2 and 20 mm or 0.3 and 20 mm. They may also be composite particles having a diameter between 1 and 50 mm, especially between 5 and 20 mm. Preference is given to particles having a diameter of more than 1 mm.

DETAILED DESCRIPTION OF INVENTION

The at least one magnetic object may have various forms. Possible forms include platelet-shaped or rod-shaped magnetic objects, but also spherical magnetic objects. The magnetic objects may consist of one crystalline phase, or else have several different phases.

"Magnetic" materials refer to those which can be attracted by a magnet, i.e., for example, ferromagnetic or superparamagnetic materials. "Magnetic" materials are also understood to mean those which are referred to as soft magnetic materials, for example ferrites. Preference is given to ferromagnetic materials.

The magnetic objects are generally solid particles having a particle size of about 10 nm to about 500 µm, preferably between 0.5 µm and 200 µm, more preferably between 0.5 and 20 µm. The ratio of the diameter of the magnetic objects in relation to the diameter of the composite particles is preferably more than 1:10, especially between 1:10 and 1:10000, preferably between 1:500 and 1:5000.

The sizes are based on the entirety of the objects present in the composite particles, and at least 90% by weight of the objects should comply with the abovementioned sizes.

In a preferred embodiment of the invention, the magnetic objects therefore comprise at least one element selected from the group consisting of Fe, Co, Ni, Cr, Mo, W, V, Nb, Ta, Ce, Pr, Nd, Pm, Sm, Eu, Gd, Tb, Dy, Ho, Er, Tm, Yb, Lu, alloys of two or more of the elements mentioned, oxides of the elements mentioned or ferrites of the elements mentioned, or a mixture of two of more thereof. For example, the magnetic objects may comprise magnetite, maghemit, goethite or a ferrite of the general formula $MFe_2O_4$ where M is an element selected from the group consisting of Cr, Ga, Cd, Mg, Mn, Li, Ca, Ni, Co, Cu, Zn, Zr or Fe(II), or a mixture of two or more thereof.

Additionally suitable for use as magnetic objects in the context of the present invention are materials such as wolframite ($FeMnWO_4$), ferberite ($FeWO_4$), permanently magnetic aluminum-nickel-cobalt alloys which comprise, as main constituents, iron, cobalt, nickel, aluminum, copper or titanium or mixtures of two or more thereof. Additionally suitable are alloys of platinum and cobalt, alloys of iron, cobalt, vanadium and chromium, ludwigite ($Mg_2Fe^{3+}[O_2/BO_4]$), vonsenite ($Fe_2^{2+}Fe^{3+}[O_2/BO_3]$), cobalt-nickel pyrites of the general formula $A^{2+}B^{3+}_2X^{2-}_4$ in which A is iron, cobalt, nickel or copper, B is iron, cobalt, nickel or chromium or a mixture of two or more thereof, and X is S, Se or Te or a mixture of two or more thereof, iron oxides such as iron(II) oxide (FeO) or iron(III) oxide ($Fe_2O_3$) in the ferromagnetic polymorph thereof, $\gamma$-$Fe_2O_3$ ) (maghemit) with spinel, magnetite ($Fe_3O_4$), cobalt alloys such as the alloys customarily used as high-temperature materials with Co-Cr matrix, Ni-Fe-Al-Co cast alloys containing up to about 36% by weight of cobalt, alloys of the CoCrW type, chromium(IV) oxide ($CrO_2$), the oxide ceramic materials of the general composition $M_2Fe^{3+}_2O_4$ or $M^{2+}Fe_2O_4$ which are assigned to the group of the ferrites and contain permanent magnetic dipoles, where M is zinc, cadmium, cobalt, manganese, iron, copper, magnesium and the like, and iron itself.

Advantageously, the at least one magnetic object consists of a ternary iron oxide from the class of the soft ferrites. These are preferably iron oxides of the formula $MFe_2O_4$ where M is selected from the group of Cr, Ga, Cd, Mg, Mn, Li, Ca, Ni, Co, Cu, Zn, Zr and Fe(II). It is also possible to use mixtures of the ferrites; preferably, M is selected from the group of Mg, Mn, Ni, Co, Cu, Zn and Fe(II).

The density of the magnetic objects is between 3 and 10 g/cm³, preferably between 4 and 6 g/cm³.

The vitreous binder phase may be any desired glass-forming composition which is compatible with the magnetic objects, i.e. does not destroy the magnetic properties, for example through the formation of solid solutions.

A vitreous phase in the context of the present invention is understood to mean a silicon-containing amorphous material. The phase may comprise further materials, for example $B_2O_3$ (0-30% by weight), $Al_2O_3$ (0-20% by weight), CaO (0-20% by weight), BaO (0-10% by weight), $K_2O$ (0-20% by weight), $Na_2O$ (0-70% by weight), MgO (0-18% by weight), $Pb_2O_3$ (0-15% by weight). The phase may thus comprise a relatively small proportion (0-5% by weight) of other oxides, such as $Mn_2O_3$, $TiO_2$, $As_2O_3$, $Fe_2O_3$, CuO, CoO, etc.

The vitreous binder phase may also be a customary one-component or multicomponent glass composition. These are known, for example, from DE 195 20 964 A1. Suitable one-component systems are, for example, $SiO_2$, $TiO_2$ and $ZrO_2$. Useable multicomponent systems are, for example, two-component systems such as 70-90% by weight of $SiO_2$/10-30% by weight of $B_2O_3$; three-component systems such as PbO/$B_2O_3$/$SiO_2$ and $P_2O_5$/$B_2O_3$/$SiO_2$; and four-component systems such as 65-92% by weight of PbO/5-20% by weight of $B_2O_3$/2-10% by weight of $SiO_2$/1-5% by weight of ZnO. Further examples of suitable glass compositions are given in C. J. Brinker, G. W. Scherer: "Sol-Gel Science—The Physics and Chemistry of Sol-Gel-Processing", Academic Press, Boston, San Diego, New York, Sydney (1990) and in DE 19 41 191, DE 37 19 339, DE 41 17 041 and DE 42 17 432.

Suitable vitreous binder phases are, for example, soda-lime glasses ($SiO_2$/CaO (0-20% by weight)/$Na_2O$ (0-70% by weight)), where the content of $Na_2O$ is preferably more than 40% by weight.

Advantageously, the magnetic composite particles, i.e. the magnetic objects and the binder phase, have a low porosity. The proportion by volume of any pores present in the overall composite particle should be below 30%, advantageously below 20%.

Advantageously, the composite particles contain a proportion of more than 40% by weight of the magnetic objects, preferably a proportion of more than 60% by weight, for example between 1:1 and 4:1, preferably between 1.5:1 and 3:1 (proportions by weight of magnetic objects:binder phase). A composite particle preferably comprises several magnetic objects.

The composite particles are ideally spherical.

In a further embodiment, the composite particles have been coated with a vitreous layer. For this layer, it is possible to use the compositions for the binder phase. The particles may be coated with the same phase which has been used as the binder phase. The coating can protect the sensitive magnetic phase of the composite particles from external influences.

The coating of the composite particles preferably has a thickness of more than 0.5 µm, especially more than 1 µm. Preference is given to a thickness between 0.5 and 20 µm, more preferably between 1 and 5 µm.

Advantageously, the coating has a low porosity. More particularly, the pores, if present, do not form a coherent network, i.e. the porosity is merely closed porosity. This is achieved more particularly by conducting any heat treatment of the coating at a temperature above the softening temperature (Tg temperature) of the coating.

The invention also relates to a process for producing magnetic composite particles.

Individual process steps are described in detail hereinafter. The steps need not necessarily be conducted in the sequence specified, and the process to be outlined may also have further unspecified steps.

In the first step a composition is produced from at least one magnetic object and/or a precursor for a magnetic object and at least one precursor of a vitreous binder phase. A precursor is understood to mean any compound or composition which can be converted under a physical (phase transformation, melting) and/or chemical transformation (oxidation, reduction, condensation, polymerization) to the desired magnetic objects or binder phases. These may be solutions, liquids or powders. They are preferably powders. The powders may also already have the structure, for example the crystalline structure, of the phase that they possess in the composite particles. For example, it is already possible to use powders consisting of the magnetic objects, which are mixed with a powder to form the binder phase.

The respective powders can be obtained customary methods, for example precipitation, sol-gel processes. The powders may also already be sintered and/or heat-treated. The particle size of the powders used may be in the range from 0.5 to 1000 µm, preferably between 1 and 100 µm.

The composition is used to produce granules. The shaping can be effected in various ways. Firstly, in the case of powders, the shaping can be accomplish by compaction or by drying a liquid or pasty material, such as a suspension or a slip. For this purpose, it may be necessary to add solvents or organic binders (0 to 40% by weight). Such processes are known to those skilled in the art. The granules can then be obtained by pelletization by means of a pelletizing plate or of an intensive mixer, or by mold pressing, or, in the case of a paste, by fluidized bed granulation, extrusion or slip casting.

Thereafter, the resulting granules are heat-treated to form the vitreous binder phase and optionally the magnetic objects.

In a further embodiment, the heat treatment is conducted at more than 500° C., preferably at more than 800° C., for example between 800° C. and 1400° C., preferably between 1000° C. and 1200° C. The temperature depends on the sintering temperature of the magnetic objects and on the melting temperature of the binder phase. The heat treatment is preferably performed above the melting temperature of the binder phase, at at least the sintering temperature of the magnetic objects. If the magnetic objects are already present in the course of shaping, for example already in the magnetic phase, the heat treatment can also be conducted between the melting temperature of the binder phase and the sintering temperature of the magnetic objects.

The heat treatment can also be performed under a particular atmosphere (inert, reducing or oxidizing).

The duration of the heat treatment may be between 30 minutes and 10 hours.

The heat-treated granules have a diameter of 0.1 to 50 mm, preferably between 0.2 and 0 mm. They may also be composite particles having a diameter between 0.3 and 50 mm, especially between 5 and 20 mm.

In a further embodiment, the heat-treated granules are coated in a further step with at least one precursor for a vitreous layer and then heat-treated. The same precursors as also used for the binder phase may be used. These are preferably also powders. In order to be able to use these for coatings, it may be necessary to use a further binder, for example a sol (for example according to DE 197 14 949 A1). This may be, for example, a sodium silicate sol. In the heat treatment, this is bonded with the powder to form a film. The heat treatment is performed at temperatures of more than 500° C., preferably more than 600° C. It can also be conducted at the same temperatures which can be used in the formation of the binder phase. Depending on the coating, it is also possible to use the same temperature, in order that there is bonding of the coating and the binder phase.

It is also possible that the heat treatment of the coating and of the binder phase are conducted together.

This can achieve better bonding of the binder phase and the coating when, for example, the powder of the coating is applied to the magnetic composite particles which are yet to be heat-treated.

The use of powders, specifically of the size of the composite particles, achieves a much more impervious and more stable coating than, for example, by growth of the coating in a sol or by spray-drying (DE 195 20 964 A1).

The invention also relates to a process for removing or extracting liquid components from geological formations or particulate materials.

For this purpose, the inventive composite particles, preferably the coated composite particles, are introduced into a geological formation or particulate materials. This can be accomplished, for example, by mixing, or by filling a well. By virtue of the preferably spherical shape of the composite particles, sufficient interstices are present for passage of the liquid or liquefiable components.

In a next step, a magnetic alternating field is applied to the composite particles. The frequency may be between 50 kHz and 10 MHz, the field strength being selected such that the product of the frequency and the square of the field strength is between 0.1 and 1000 MHz (kA/m)$^2$. This alternating field results in inductive heating of the composite particles. As a result, the environment of the composite particles is also heated. This can result in lowering of the viscosity of a surrounding liquid or even to the vaporization of volatile constituents. These constituents can thus be removed or extracted. Alternatively, it is also possible to lower the viscosity of a liquid passing through. This can, for example, enhance the flow of an oil source. In the case of particulate materials, the phase separation can be facilitated.

The field can be applied continuously or else in pulsed form in order to avoid overheating.

In the case of cleaning of particulate materials, for example oil-containing sands, the materials are blended with the composite particles, for example in a proportion of 5:1 to 1:5 by weight. The proportion may be guided by the evolution of heat required; the lower the temperature, the lower the proportion of the composite particles must be. In the case of heating by the application of an alternating field, it is firstly possible to remove volatile components by distillation, and it is secondly possible to partly separate liquefied components, for example by centrifugation. Optionally, the particulate material can be cleaned further with a volatile solvent. Such solvents have a boiling point between 30° C. and 200° C., preferably between 50 and 150° C. Such solvents are, for example, $C_{1-5}$ ketones, such as acetone, propanone; ethers, such as diethyl ether, tert-butyl methyl ether, tetrahydrofuran; alkanes, such as n-pentane, n-hexane; halogenated alkanes. This volatile solvent can then be removed easily by heating again. It is also possible to use mixtures of solvents.

The composite particles can be magnetically separated from the cleaned material after the process and reused.

The invention also relates to a proppant comprising the magnetic composite particles described; the proppant preferably corresponds to a magnetic composite particle.

The invention also relates to the use of the magnetic composite particles for generation of heat by application of an external magnetic alternating field, especially for distillative removal or liquefaction of volatile or liquefiable constituents in mixtures. This can be accomplished, for example, by mixing the particles with the mixture, which is preferably a particulate material. The application of an alternating field generates heat in the mixture. This has the advantage that the heating takes place homogeneously in the mixture without formation of great heat differences which can lead, for example, to decomposition of the substances. There is also no need for stirring or mixing during the heating. However, mixing can facilitate the escape of the substance to be removed. For this application, suitable composite particles are those having a diameter of more than 1 mm, preferably more than 3 mm, for example between 3 and 10 mm or 2 and 5 mm.

The invention also relates to the use of the magnetic composite particles as proppants or for removal or extraction of liquid or liquefiable components from geological formations or particulate materials, for example for cleaning of oil-containing sands, increasing the flow in oil sources. The magnetic composite particles can be introduced into the fissure as a suspension. Thereafter, by introducing an alternating field generator into the well, a magnetic alternating field can be generated therein. This leads to heating directly in the underground formation. By virtue of the range of the alternating field, heating can be achieved through a volume. For this application, suitable composite particles are those having a diameter of below 2 mm, for example between 0.5 and 1 mm. As a result, suspensions of these particles are preserved for longer, in order that the particles do not settle out too rapidly in the course of introduction.

Further details and features are evident from the description of preferred working examples which follows in conjunction with the dependent claims. In this context, the respective features can each be implemented alone, or several can be implemented in combination with one another. The means of solving the problem are not restricted to the working examples. For example, ranges stated always include all unspecified intermediate values and all conceivable partial ranges.

EXAMPLE 1

Production of Magnesium Ferrite Powder

Magnesium acetate and iron(III) citrate are dissolved separately each in a concentration of 1 mol/l in deionized water. Equal amounts of these solutions are mixed with one another. The resulting solution is concentrated by drying in a drying cabinet at 150° C., which results in a dark greenish-brown cake. This cake is crushed dry in a ball mill to give a fine powder having a particle size in the submicrometer range. This powder is pyrolyzed by gradual heating at a temperature of 300 to 500° C. and then fired at a temperature of 1100° C. to obtain dark red magnesium ferrite powder. The resulting powder has a particle size between 0.5 and 2 μm (determined by TEM).

Production of Soda-Lime Silicate Xerogel 58.5 g of tetraethoxysilane are initially charged. For this purpose, 30.5 g of sodium ethoxide, 54 g of ethanol and 1.2 g of metallic calcium are added in sequence, in the course of which the mixture heats up. After cooling, the mixture is stirred under reflux for 24 h.

Addition of 8.3 g of water to 60 g of this sol causes gelation. This gel is dried at 80° C. and ground to a fine xerogel powder with a particle size of 0.1 to 1 μm. This is treated at 300° C. for 2 hours for stabilization.

Production of Composite Core Particles

The magnesium ferrite powder and the soda-lime-silicate xerogel are mixed with one another in a weight ratio of 2:1. A ten percent glucose solution is added to this mixture at a gradually increasing rate until a pasty, macroscopically homogeneous material is formed. This material is extruded through a syringe to give strands, which are then rolled between two plates provided with grooves to give balls of about 2 mm in size (diameter +/−1 mm). These balls are fired at 1100° C.

Coating of the Core Particles

The fired core particles are wetted with a sodium silicate sol (NaSi, according to DE 197 14 949 example 2:25 ml (124.8 mmol) of methyltriethoxysilane (MTEOS) are stirred with 7 ml (31.4 mmol) of tetraethoxysilane (TEOS) and 0.8 g (20 mmol) of sodium hydroxide at room temperature overnight (at least 12 hours) until all of the sodium hydroxide has dissolved and a clear yellow solution is present; subsequently, 3.2 ml (177.8 mmol) of water are slowly added dropwise at room temperature, in the course of which the solution heats up. After the addition of water has ended, the clear yellow solution is stirred at room temperature until it has cooled again, and then filtered through a filter having a pore size of 0.8 μm.) and, in the still-wet state, allowed to fall into a bed of soda-lime-silicate xerogel (see above) and immediately covered with this powder. As a result of drying, this results in formation of a shell of pulverulent soda-lime-silicate xerogel bound by a continuous phase of sodium silicate xerogel. In the course of baking at 700° C., this shell melts to give a coherent, impervious and chemical-resistant film of thickness of 3 to 5 μm.

The imperviosity and stability of the shell were demonstrated by a leaching test in dilute hydrochloric acid, in which no discoloration of the leaching medium was observed over several weeks. In contrast, in the case of uncoated core particles, vigorous yellowing occurs even over the course of a few seconds.

EXAMPLE 2

Production of Coated Magnetic Composite Particles

Production of the Core Particles

Soda-lime-silicate xerogel is mixed with iron(III) oxide (hematite; red pigment produced by means of chemical precipitation) and magnesium hydroxide so as to result in the same molar ratios as in example 1. The mixture is mixed in an intensive mixer (Eirich TR-02), in the course of which 10% glucose solution is added gradually until formation of substantially spherical agglomerates of a few millimeters in diameter. These agglomerates are first dried at 80° C. in a drying cabinet, which gives spherical green bodies.

Coating and Baking

A bed of finely divided $SiO_2$ (Aerosil Ox50) is prepared in a shallow basin. Individual green bodies are introduced into this at sufficient distance from one another and covered with a further layer of Aerosil.

Gentle pressure increases the density of this arrangement, and it is then baked at 1100° C. In the course of this, the molten glass matrix partly dissolves the surrounding $SiO_2$ powder and bonds with it to give an impervious shell.

EXAMPLE 3

Distillation of the Volatile Oil Fraction out of an Oil Sand Sample

A sample of about 5 g of oil sand was admixed with about 15 g of magnetic composite particles from example 2 and introduced into a large beaded edge bottle. This was exposed to the magnetic field from an RF generator (Linn HTG 750/0.5), and the field strength of the outer field at about 6 kA/m (effective value) at about 220 kHz remained well below the maximum performance of the generator. Within 1-2 minutes, significant release of gaseous components was observed, which were precipitated as a yellowish liquid film in the upper, cold region of the beaded edge bottle. The temperature attained was checked after the generator had been switched off by introducing a thermocouple. This measured a value of more than 170° C.

The experiment with magnetic composite particles from example 2 which had been heat-treated at 1100° C. without coating gave the same result.

LITERATURE CITED

EP 1 232 502 B1
DE 196 14 136 A1
DE 199 40 220 A1
DE 195 20 964 A1
DE 19 41 191
DE 37 19 339
DE 41 17 041
DE 42 17 432
C. J. Brinker, G. W. Scherer: "Sol-Gel Science—The Physics and Chemistry of Sol-Gel-Processing", Academic Press, Boston, San Diego, New York, Sydney (1990)

The invention claimed is:
1. Magnetic composite particles comprising composite particles comprising at least one magnetic object and a vitreous binder phase, wherein the composite particles have a diameter between 0.1 and 50 mm and wherein the proportion of at least one magnetic object in relation to the vitreous binder phase, measured by % by weight, is between 1:1 and 4:1.
2. Magnetic composite particles as claimed in claim 1, wherein the magnetic object comprises a ternary iron oxide from the class of the soft ferrites.
3. Magnetic composite particles as claimed in claim 1, wherein the magnetic object comprises a ternary iron oxide of the formula $MFe_2O_4$ where M is selected from the group consisting of Cr, Ga, Cd, Mg, Mn, Li, Ca, Ni, Co, Cu, Zn, Zr and Fe(II).
4. Magnetic composite particles as claimed in claim 1, wherein the composite particles have been coated with a vitreous layer.
5. Magnetic composite particles as claimed in claim 4, wherein the vitreous layer has a thickness of more than 0.5 μm.
6. A proppant comprising magnetic composite particles as claimed in claim 1.
7. A process for removing or extracting liquid or liquefiable components from geological formations or particulate materials, comprising:
   a) introducing magnetic composite particles as claimed in claim 1 into geological formations or particulate materials;
   b) inductively heating the magnetic composite particles by applying an external magnetic alternating field;
   c) removing or extracting liquid or liquefiable components.
8. A process according to claim 7, wherein a frequency of the magnetic alernating field is from 50 kHz to 10 MHz.
9. The use of magnetic composite particles as claimed in claim 1 for generation of heat by application of an external magnetic alternating field.
10. The use of magnetic composite particles as claimed in claim 1 as proppants.
11. A method of generating heat, comprising applying an external magnetic field to the magnetic composite particles as claimed in claim 1.
12. Magnetic composite particles according to claim 1, wherein the proportion of the at least one magnetic object is more than 40% by weight.

13. Magnetic composite particles according to claim 1, wherein the proportion of the at least one magnetic object is more than 60% by weight.

14. A process for producing magnetic composite particles, comprising:
   a) producing a composition from at least one magnetic object and/or a precursor for a magnetic object and at least one precursor of a vitreous binder phase;
   b) producing granules from the composition; and
   c) heat treating the granules to form the vitreous binder phase,
   wherein the proportion of the at least one magnetic object in relation to the vitreous binder phase, measured by % by weight, is between 1:1 and 4:1.

15. The process as claimed in claim 14, wherein the heat treatment is conducted at more than 500° C.

16. The process as claimed in claim 14, wherein the heat-treated granules have a diameter of 0.1 to 50 mm.

17. The process as claimed in claim 14, wherein the heat-treated granules are coated in a further step with at least one precursor for a vitreous layer and then heat-treated.

* * * * *